United States Patent [19]

Kawabe et al.

[11] Patent Number: 5,006,631
[45] Date of Patent: Apr. 9, 1991

[54] AROMATIC POLYESTER CARBONATE FROM DIPHENOL MIXTURE

[75] Inventors: Masanao Kawabe, Tokyo; Masao Kimura, Kawasaki; Kazuhiro Sugiyama, Tokyo; Ikuro Yamaoka, Kawasaki; Hiroharu Inoue, Tokyo, all of Japan

[73] Assignees: Nippon Steel Corporation; Nippon Steel Chemical Co., Ltd., both of Tokyo, Japan

[21] Appl. No.: 383,155

[22] Filed: Jul. 19, 1989

[30] Foreign Application Priority Data

Jul. 20, 1988 [JP] Japan .................. 63-179146
Sep. 27, 1988 [JP] Japan .................. 63-239863
Apr. 21, 1989 [JP] Japan .................. 1-100132
Apr. 21, 1989 [JP] Japan .................. 1-100133

[51] Int. Cl.$^5$ .................................. C08G 63/64
[52] U.S. Cl. .................................. 528/204; 528/125; 528/176; 528/191; 528/193; 528/202
[58] Field of Search ............ 528/204, 202, 125, 176, 528/191, 193

[56] References Cited

U.S. PATENT DOCUMENTS 3,169,121 2/1965 Goldberg ...................... 260/47
3,553,167 1/1971 Schnell et al. ................. 260/47
4,579,934 4/1986 Brinkmeyer et al. ............ 528/193

FOREIGN PATENT DOCUMENTS 60-38427 2/1985 Japan .
62-70417 3/1987 Japan .
1568541 5/1980 United Kingdom .

OTHER PUBLICATIONS

EP-A-303,931 (Abstract) 2.89.
EP-A-303,935 (Abstract) 2.89.

*Primary Examiner*—Harold D. Anderson
*Attorney, Agent, or Firm*—Wenderoth, Lind & Ponack

[57] ABSTRACT

An aromatic polyester carbonate comprising structural units represented by the following formulae (A), (B), (C), and (D) and satisfying the following relationship when the mole fractions of the structural units represented by the formulae (A), (B), (C), and (D) are defined as a, b, c, and d, respectively:

$$0 \leq \frac{d}{a+b} \leq 0.50$$

and having an inherent viscosity [$\eta_{inh}$] in a solution at a concentration of 0.5 g/dl in p-chlorophenol as a solvent at 50° C. of 1.0 dl/g or higher, or being insoluble in the solvent, and having liquid crystal properties

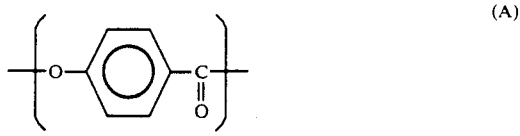
(A)

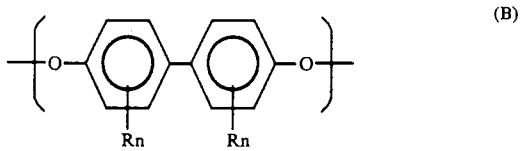

(B)

wherein R is the same or different and represent an alkyl, phenyl group or a halogen, and n represents an integer of 0 to 4;

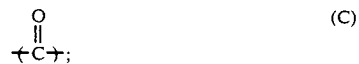

(C)

and

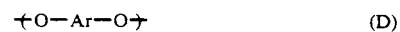
(D)

wherein Ar represents 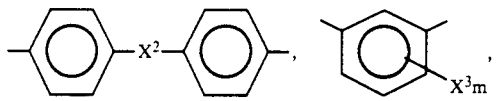 ,

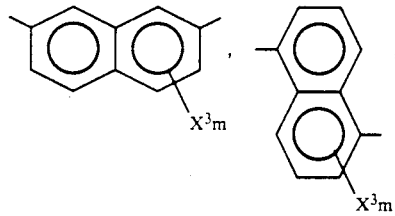

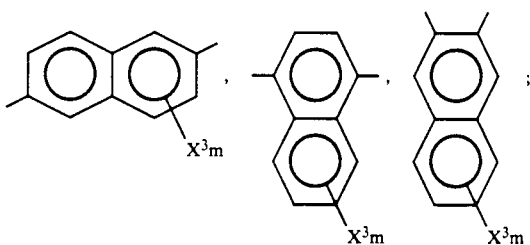

$X^1$ represents a substituted or non-substituted phenyl group, an alkyl group having 3 to 6 carbon atoms or a halogen;
$X^2$ represents —O—, —S—,

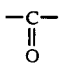

or —CH$_2$—; $X^3$ may be the same or different and represents an alkyl group, phenyl group, or a halogen; and m represents an integer of 0 to 4.

12 Claims, No Drawings

AROMATIC POLYESTER CARBONATE FROM DIPHENOL MIXTURE

BACKGROUND OF THE INVENTION

1. Field of the Invention

The present invention relates to a novel aromatic polyester carbonate, more particularly to an aromatic polyester carbonate having a good melt moldability and able to provide a molded product having excellent physical properties, and having liquid crystal properties, and to a process for producing the same.

2. Description of the Related Art

Recent technical advances in various fields of industry, and energy saving policies conducted in an effort to conserve energy resources have led to a demand for higher performance and lighter weight organic polymeric materials.

Further, there is a demand for higher performance materials which can be used as metal alternatives. To meet these demands for higher performance plastics, polymers having excellent mechanical properties such as optically anisotropic liquid crystal polymers characterized by parallel arrangements of molecular chains are under research. Representative of such liquid crystals is a wholly aromatic polyester but, for example, poly (p-oxybenzoate) "EKONOL", which is its copolymer, have too high melting points, and therefore, melt molding is impossible or very difficult.

German Patent No. 2704315 discloses a thermotropic wholly aromatic polyester carbonate based on p-hydroxybenzoic acid, carbonic acid, hydroquinone and, if desired, an aromatic dicarboxylic acid. These polyester carbonates have a flow temperature of at least 265° C, but the melt viscosity is too high and melt molding is difficult.

Furthermore, Japanese Unexamined Patent Publication (Kokai) No. 60-38427 discloses a thermotropic wholly aromatic polyester carbonate based on p-hydroxybenzoic acid, carbonic acid, diphenol, 4,4'-dihydroxydiphenyl as diphenol and, if desired, an aromatic dicarboxylic acid. In Examples of the above published patent specification, only an aromatic polyester carbonate using hydroquinone as the diphenol component is disclosed, but the moldable temperature range of the aromatic polyester carbonate obtained was 260° C. or higher, and thus the polyester carbonate has an unsatisfactory moldability. Further, in the above published patent specification, although a large number of diphenols are shown as examples of the diphenol component,

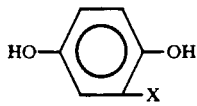

wherein X represents an substituted or non-substituted phenyl group, an alkyl group having 3 to 6 carbon atoms or a halogen, an Example using these monomers as the diphenol unit is not disclosed, and thus the effect gained by using these monomers is not clear.

Further, among monomers represented by the general formulae:

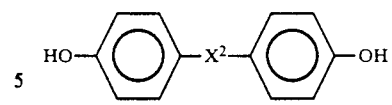

wherein $X^2$ represents —O—, —S—, —C—, or —CH$_2$—;
$\phantom{wherein X^2 represents —O—, —S—, —}\overset{\|}{\phantom{C}}$
$\phantom{wherein X^2 represents —O—, —S—, —C}O$

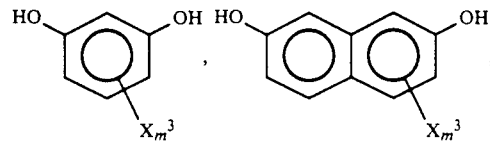

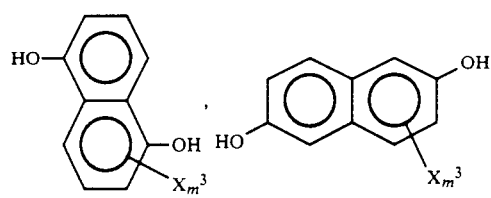

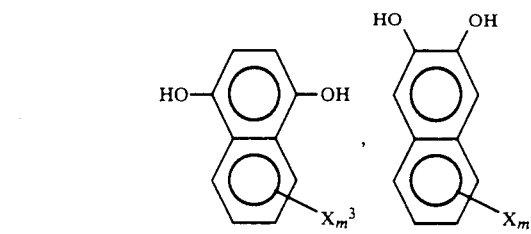

wherein $X^3$ are the same or different and represent an alkyl group, phenyl group, or a halogen, and m is an integer of 0 to 4, 4,4'-dihydroxydiphenyl ether, 4,4'-dihydroxydiphenyl sulfide, 4,4'-dihydroxydiphenyl benzophenone, 4,4'-dihydroxydiphenyl methane, resorcinol, 2,7-dihydroxynaphthalene, 1,5-dihydroxynaphthalene, 2,6-dihydroxynaphthalene, 1,4-dihydroxynaphthalene, 2,3-dihydroxynaphthalene are exemplified. But, an Example using these monomers as the diphenol unit is not disclosed and the effect gained by using these monomers is not clear.

On the other hand, a polyester carbonate comprising structural units represented by the formulae:

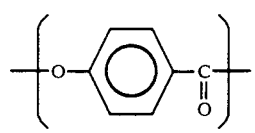
(A)

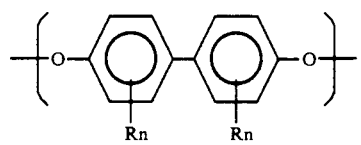
(B)

wherein R may be the same or different and represents an alkyl group, phenyl group or a halogen, and n is an integer of 0 to 4,

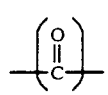
(C)

is disclosed in, for example, a Comparative example of Japanese Unexamined Patent Publication (Kokai) No. 62-70417, but since the polymerization reaction is completed at a temperature of 300° C. and under a pressure of 1 mmHg, the resultant polymer has a reduced viscosity [ηsp/C] of a solution at a 0.2 g/dl concentration in p-chlorophenol as the solvent at 60° C, of as low as 0.52 dl/g, and accordingly, the mechanical properties thereof are not satisfactory. Further, the above specification does not disclose the liquid crystal property of the polyester carbonate shown by the previous general formulae.

SUMMARY OF THE INVENTION

Accordingly, the objects of the present invention are to eliminate the above-mentioned disadvantages of the prior art and to provide an aromatic polyester carbonate having a good melt moldability and able to provide a molded product having excellent physical properties, and having liquid crystal properties.

Another object of the present invention is to provide a process for producing the above-mentioned aromatic polyester carbonate.

Other objects and advantages of the present invention will be apparent from the following description.

In accordance with the present invention, there is provided an aromatic polyester carbonate comprising structural units represented by the following formulae (A), (B), (C), and (D) and satisfying the following relationship when the mole fractions of the structural units represented by the formulae (A), (B), (C) and (D) are defined as a, b, c, and d, respectively:

$$0 \leq \frac{d}{a+b} \leq 0.50$$

and having an inherent viscosity [$\eta_{inh}$] in a solution at a concentration of 0.5 g/dl in p-chlorophenol as a solvent at 50° C. of 1.0 dl/g or higher, or being insoluble in the solvent, and having liquid crystal properties

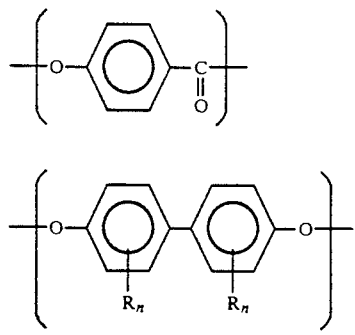

(A)

(B)

wherein R are the same or different and represents an alkyl, phenyl group or a halogen, and n represents an integer of 0 to 4;

(C)

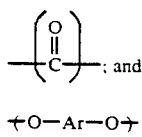; and

+O—Ar—O+ (D)

wherein Ar represents

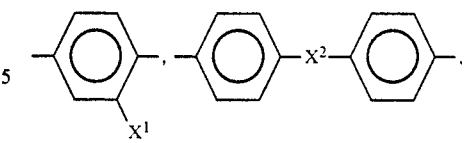

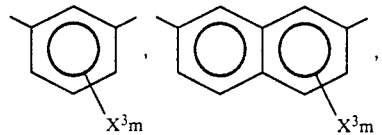

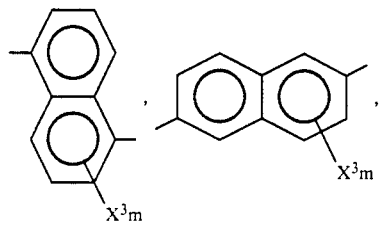

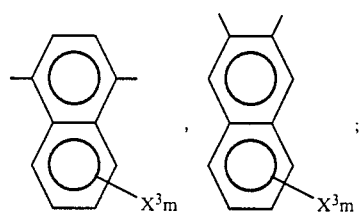

$X^1$ represents a substituted or non-substituted phenyl group, an alkyl group having 3 to 6 carbon atoms or a halogen;

$X^2$ represents —O—, —S—, $X^2$ represents —O—, —S—, —C— or —CH$_2$—;
                              ‖
                              O $X^3$ are the same or different and represent an alkyl group, phenyl group, or a halogen; and m represents an integer of 0 to 4.

In accordance with the present invention, there is also provided a process for producing the aromatic polyester carbonate according to claim 1, which comprises reacting hydroxybenzoic acid or a hydroxybenzoic acid ester represented by the formula (1) shown below, a diphenol represented by the formula (2), a diphenol represented by the formula (3), and diphenyl carbonate at a temperature of from 160° C. to lower than 260° C. in the presence of a catalyst under a reduced pressure and then carrying polymerizing at a temperature of from 260 to 400° C under a pressure of 10 mmHg or lower:

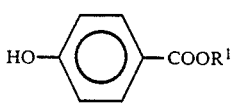 (1)

wherein $R^1$ represents hydrogen, an alkyl group, phenyl group or an alkyl-substituted phenyl group;

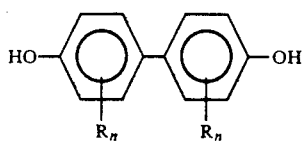  (2)

wherein R either the same or different and represent an alkyl group, phenyl group or a halogen, and n represents an integer of 0 to 4;

HO—Ar—OH   (3)

wherein Ar represents

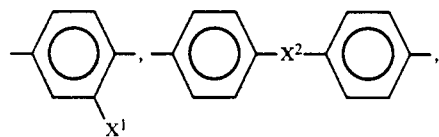

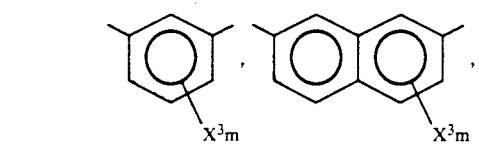

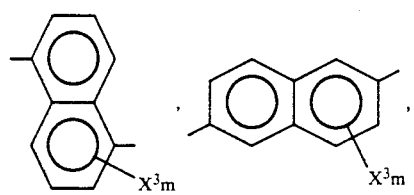

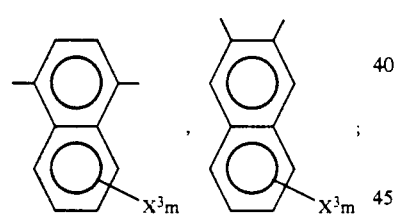  ;

wherein $X^1$ represents a substituted or non-substituted phenyl group, an alkyl group having 3 to 6 carbon atoms, or a halogen; $X^2$ represents —O—, —S—,

or —CH$_2$—; $X^3$ may be the same or different and represents an alkyl group, phenyl group, or a halogen; and m represents an integer of 0 to 4.

DESCRIPTION OF THE PREFERRED EMBODIMENTS

The present invention is now described in detail.

The unit of formula (A) constituting the wholly aromatic polyester carbonate obtained by the present invention is derived from an aromatic hydroxycarboxylic acid or an aromatic hydroxycarboxylate represented by the formula:

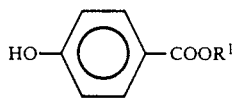   Formula (1)

wherein $R^1$ represents a hydrogen atom, an alkyl group, phenyl group or an alkyl substituted phenyl group.

The unit of formula (B) is derived from a diphenol (I) represented by the formula:

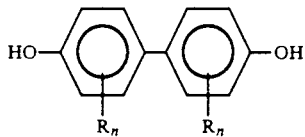   Formula (2)

wherein R represent an alkyl group, phenyl group or a halogen which are the same or different; and n represents an integer of 0 to 4.

The unit of formula (D) is derived from a diphenol (II), represented by Formula (3):

HO-Ar-OH wherein Ar represents

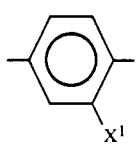

where $X^1$ represents a substituted or non-substituted phenyl group, an alkyl group having 3 to 6 carbon atoms or a halogen;

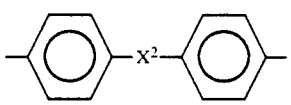

where $X^2$

—O—, —S—, —C—, or —CH$_2$—;
         ‖
         O

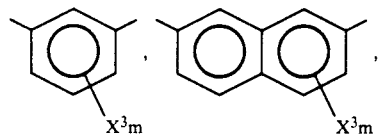,

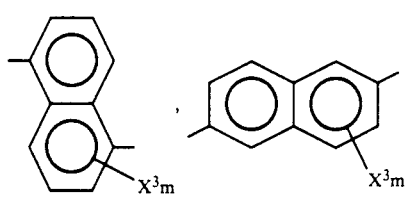

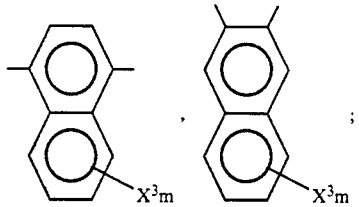

where $X^3$ may be the same or different and represent an alkyl group, a phenyl group, or a halogen; and m is an integer of 0 to 4.

The unit of the formula (C) can be derived from diphenyl carbonate. Here, the amount of diphenyl carbonate used must be substantially equimolar or more relative to the total sum of the diols represented by the formulae (B) and (D). Preferably, 0.95 to 3.0-fold moles of diphenyl carbonate is used relative to the total sum of the diols represented by the formulae (B) and (D). This is because, at an amount less than 0.95-fold mole, the molecular weight of the aromatic polyester carbonate cannot be increased, and at an amount in excess of 3.0-fold, the reaction time is undesirably prolonged.

In the polyester carbonate of the present invention, it is important to satisfy the following relationship, when the mole fractions of the units represented by formula (A), formula (B), formula (C) and formula (D) are defined as a, b, c and d, respectively:

$$0 \leq \frac{d}{a + b} \leq 0.50$$

$$\text{preferably } 0 < \frac{d}{a + b} \leq 0.50$$

Namely although the polyester carbonates composed of the units represented by the formulae (A), (B), and (C) possess the desired properties from the commercial points of view, by an addition of the units represented by formula (D) to the units represented by formula (A) and formula (B), the transition temperature to the liquid crystal phase of the polyester carbonate is further lowered and a useful property in industrial practice in that the moldable temperature range is broadened is obtained. If the content of formula (D) becomes too high, the mechanical properties of the polyester carbonate become poor, and if too low, the broadening of the moldable temperature range is insufficient, and therefore, more preferably the range shown below is used.

$$0.05 \leq \frac{d}{a + b} \leq 0.40$$

Also, the molar fractions of other units, preferably satisfy the following relationship:

$$0.10 \leq \frac{a}{a + b} \leq 0.90$$

This is because, if the content of the unit represented by formula (A) is less than 0.10, the melting point of the polyester carbonate is too high, whereby melt molding becomes difficult, and the mechanical properties of the molded product become poor. If the content exceeds 0.90, the melting point of the polyester carbonate becomes too high, whereby melting molding again becomes difficult.

Also, the above content ratio is more preferably in the range shown by the following formula:

$$0.40 \leq \frac{a}{a + b} \leq 0.70$$

The aromatic polyester carbonate of the present invention consists substantially of the units represented by the formulae (A), (B), (C) and (D) as described above, and units other than those mentioned above can be incorporated within the range which does not impair the desired properties. Examples of such units include isophthalic acid, terephthalic acid, 1,2-ethylene-bis(p-carboxyphenoxy), 1,4-naphthalenedicarboxylic acid, 1,5-naphthalenedicarboxylic acid, 4,4'-diphenyl dicarboxylic acid, 3,3'-diphenyldicarboxylic acid, 1,3-naphthalenedicarboxylic acid, 1,6-naphthalenedicarboxylic acid, 2,7-naphthalenedicarboxylic acid, 3,4'-diphenyldicarboxylic acid, 1,4-cyclohexanedicarboxylic acid, 6-hydroxy-2-naphhoic acid, m-hydroxybenzoic acid, Bisphenol-A, and Bisphenol-S.

These units can be contained at a ratio of up to 5 mole %, preferably up to 3 mole % in the total constituting units.

The aromatic polyester carbonate of the present invention preferably has an inherent viscosity [$\eta_{inh}$] in a solution at 0.5 g/dl concentration in p-chlorophenol as the solvent at 50° C. of 1.0 dl/g or higher. Also, when the aromatic polyester carbonate is partially soluble or insoluble in p-chlorophenol, it may be considered to have the minimum viscosity mentioned above.

Here, an inherent viscosity of 1.0 dl/g or higher is preferable, because if the inherent viscosity is lower than 1.0 dl/g, the mechanical properties of the molded product are poor.

Also, the aromatic polyester carbonate of the present invention may have a remarkably reduced viscosity or become insoluble in the above solvent after the solid phase polymerization by the heat treatment, and this aromatic polyester carbonate is also included within the scope of the aromatic polyester carbonate of the present invention.

The aromatic polyester carbonate of the present invention can be produced by the polycondensation process of polyesters of the prior art. The production process is not particularly limited, but preferably the production process described below is used.

Namely, after the reaction is carried out under a reduced pressure or atmospheric pressure at a temperature of from 160° C. to less than 260° C, preferably at a temperature of from 180° C. to less than 260° C, the reaction must be carried out under a pressure of 10 mmHg or lower at a temperature of from 260° C. to 400° C, preferably at a temperature of from 260° C. to 360° C.

This is because, first the reaction is carried out under a reduced pressure or atmospheric pressure or lower at a temperature of from 160° C. to lower than 260° C, because monomers will be evaporated out of the reaction system to lower the yield if the reaction is carried out at a high temperature and high vacuum from the initial stage, but the polymerization reaction is completed under a pressure of 10 mmHg and at a temperature of from 260° C. to 400° C, to effectively evaporate the reaction by-products out of the system and obtain a high molecular weight polyester carbonate. Namely, if the polymerization is completed under a pressure exceeding 10 mmHg or at a temperature lower than 260°

C, a high molecular weight polymer cannot be obtained, and at a temperature over 400° C, the polymer will be undesirably deteriorated.

Representative embodiments include, for example, the following processes (1) to (3).

(1) The production process according to a phenol eliminating polycondensation from the diphenols (I) and/or (II) represented by the formula (2) and the formula (3), diphenyl carbonate and phenyl p-hydroxybenzoate.

(2) The production process according to a phenol eliminating polycondensation reaction by reacting a desired amount of diphenyl carbonate with p-hydroxybenzoic acid to form a phenyl ester, and then adding the diphenols (I) and/or (II) represented by the formula (2) and the formula (3).

(3) The production process according to a phenol eliminating polycondensation from p-hydroxybenzoic acid, diphenyl carbonate and the diphenols (I) and/or (II) represented by the formula (2) and the formula (3).

The reaction is preferably carried out/in the presence of a catalyst. Preferable examples of this catalyst include magnesium acetate, manganese acetate, sodium acetate, potassium acetate, zinc acetate, titanium tetrabutyrate, titanium tetrapropylate, sodium phenolate, zirconium butyrate, zirconium propylate, titanium tetraphenolate, germanium dioxide, antimony trioxide, dibutyltin diacetate, dibutyldimethoxy tin, and n-butylstannoic acid. The amount of the catalyst employed is preferably 0.0001 to 1% by weight, more preferably 0.001 to 0.2% by weight, based on the total weight of the monomers used.

Also, the product obtained is further preferably subjected to the solid phase polymerization at a temperature of 180 to 300° C, as after 2 to 48 hours, the molecular weight is increased and the characteristics of the aromatic polyester carbonate are further improved.

The melting of the polyester carbonate of the present invention indicates the liquid crystal state. The liquid crystal state as mentioned herein can be observed with a polarized microscope. That is, in an optical system provided with a pair of polarizers crossed at 90° in the molten state, when the property of light permitted to pass through the whole range or a part thereof is exhibited, the polyester carbonate is classified as a thermotropic liquid crystal. Also, the transition temperature from the crystal phase to the liquid crystal phase is measured by a differential scanning calorimetry (DSC) at a temperature elevation rate of 10° C/min.

The thermal decomposition initiation temperature (Td) is measured by thermogravimetric analysis (TG) in a dry nitrogen stream at a temperature elevation rate of 10° C/min, and the temperature corresponding to the crossing of the tangential line drawn at the flex point of the decomposition step in the thermogravimetric curve with the zero horizontal line of the thermogravimetric curve is defined as the thermal decomposition initiation temperature ($T_d$).

The aromatic polyester carbonate of the present invention thus obtained has a transition temperature from the crystal phase to the liquid crystal phase of as low as 400° C, is optically anisotropic and has particularly excellent mechanical properties in the monoaxial direction, and can be used for a conventional melt molding such as extrusion molding, injection molding, compression molding, or blow molding, to be processed into fibers, films, molded articles, vessels, and hoses.

Also, during molding, reinforcing materials such as glass fibers, carbon fibers, asbestos; additives such as fillers, nucleating agents, flame retardants, pigments, antioxidants, stabilizers, plasticizers, lubricants, mold release agents; and other thermoplastic resins are added to the aromatic polyester carbonate of the present invention, to impart desired characteristics to the molded articles.

The aromatic polyester carbonate of the present invention has a good melt moldability, and very good mechanical properties due to the parallel molecular arrangement caused by the liquid crystal properties thereof.

EXAMPLES

The present invention will now be further illustrated by, but is by no means limited to, the following Examples.

EXAMPLES 1

An amount of 20.00 g (0.093 mole) of phenyl p-hydroxybenzoate (IV), 11.59 g (0.062 mole) of 4,4'-dihydroxydiphenyl (V), 14.67 g (0.068 mold) of diphenyl carbonate, and 0.005 g ($2.2 \times 10^{-5}$ mole) of n-butylstannoic acid as the catalyst were charged into a polymerization reactor equipped with a stirrer and a vacuum evaporation device, and heated to 220° C. in a nitrogen gas stream under a pressure set of 650 mmHg. After heating for 15 hours and 20 minutes, while elevating the temperature gradually to 300° C, phenol was evaporated over one hour and 15 minutes.

The pressure was gradually reduced to 0.1 mm Hg, and at the same time, the reaction temperature elevated to 320° C. and the reaction was carried out over 40 minutes. After completion of the reaction, a beige polyester carbonate was obtained.

The reduced viscosity [$\eta_{sp}/C$] of the polyester carbonate obtained at a 0.2 g/dl concentration in p-chlorophenol as a solvent at 60° C. was measured, and it was found that the reducing viscosity of the polyester carbonate was 1.54 dl/g.

Furthermore, the inherent viscosity $\eta_{inh}$] of the polyester carbonate obtained above at a 0.5 g/dl concentration in p-chlorophenol as a solvent at 60° C. was 1.34 dl/g.

Also, by measurement by DSC, the transition temperature from the crystal phase to the liquid crystal phase was found to be 238° C, and the optical anisotropic phase was observed by a polarizing microscope at 240° C. or higher. The thermal decomposition initiation temperature (Td) was found to be 485° C. by thermogravimetric analysis.

The polyester carbonate was dried under a reduced pressure at 120° C. for 8 hours, and then extruded by a melt spinning device equipped with a spinneret having an opening diameter of 0.4 mm at a spinneret temperature of 245° C, and wound up at a speed of 247 m per minute. The polyester carbonate fiber obtained had a high strength and a high modulus, with a tensile strength of 24.0 kg/mm$^2$, an elongation of 1.4%, and a tensile modulus of 1860 kg/mm$^2$.

EXAMPLES 2, 3, 4, and 5

Polyester carbonates with different monomer composition ratios (formulae (IV) and (V) and diphenyl carbonate and bisphenol-A) were synthesized in the same manner as in Example 1 except that the temperature for completion of the polymerization was 350° C. The values of the reduced viscosity, liquid crystal phase transition temperature, and $T_d$ are shown in Table 1.

These polyester carbonates all exhibited liquid crystal properties during melting, and when removed from the polymerization device, polymers in the form of tough fibrils were obtained.

tion was carried out by the same method as in Example 6.

After completion of the reaction a pale brown polyester carbonate was obtained. The yield was found to be 24.31 g (97% by weight), and the inherent viscosity $[\eta_{inh}]$ was 1.51. Also, by measurement by DSC, the

TABLE 1

| Example | Compostion (mole %) | | | |
|---|---|---|---|---|
| | 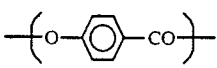 | 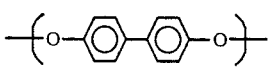 |  | 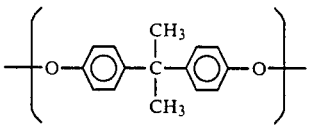 |
| 1 | 43 | 28.5 | 28.5 | |
| 2 | 54 | 23 | 23 | |
| 3 | 34 | 33 | 33 | |
| 4 | 25 | 37.5 | 37.5 | |
| 5 | 43 | 26.4 | 28.6 | 2 |

| Example | Note 1 Reduced viscosity $[\eta sp/C]$ (dl/g) | Note 2 Liquid crystal phase transition temperature (°C.) | Note 3 Td (°C.) |
|---|---|---|---|
| 1 | 1.54 | 238 | 485 |
| 2 | Insoluble | 262 | 480 |
| 3 | Insoluble | 278 | 484 |
| 4 | Insoluble | 291 | 492 |
| 5 | Insoluble | 246 | 468 |

Note 1 p-Chlorophenol measured at 60° C., 0.2 g/dl
Note 2 DSC (DSC30, manufactured by Metler Co.) measured at temperature elevation rate: 10 (°C./min)
Note 3 TGA (TG 50, manufactured by Metler Co.) measured at temperature elevation rate: 10 (°C./min)

EXAMPLE 6

An amount of 18.21 g (0.085 mole) of phenyl p-hydroxybenzoate, 10.55 g (0.057 mole) of 4,4'-dihydroxydiphenyl, 2.64 g (0.014 mole) of phenylhydroquinone, 16.69 g (0.078 mole) of diphenyl carbonate, and 0.005 g ($2.2 \times 10^{-5}$ mole) of n-butylstannoic acid as the catalyst were charged into a polymerization reactor equipped with a stirrer and a vacuum evaporation device, and heated to 200° C. in a nitrogen gas stream under a pressure of 650 mmHg. By elevating the temperature gradually to 300° C. over 9 hours and 30 minutes, phenol was further evaporated, the pressure was gradually reduced to 0.6 mm Hg, and the reaction was carried out over 55 minutes.

After completion of the reaction, a pale brown polyester carbonate was obtained. The yield was found to be 24.13 g (95% by weight), and the inherent viscosity $[\eta_{inh}]$ was found to be 1.60. Also, by measurement by DSC, the transition temperature from the crystal phase to the liquid crystal phase was found to be 203° C, and an optical anisotropic phase was observed by a polarizing microscope at 200° C. or higher. The thermal decomposition initiation temperature (Td) by thermogravimetric analysis was found to be 470° C.

The polyester carbonate was dried under a reduced pressure at 120° C. for 8 hours, and then spun by a melt spinning device equipped with a spinneret having an opening diameter of 0.4 mm at a spinning temperature of 220° C. The polyester carbonate fiber obtained had a high strength and a high modulus, with a tensile strength of 28.6 kg/mm$^2$, a tensile modulus of 2560 kg/mm$^2$, and an elongation of 2.0%.

EXAMPLE 7

By using 18.21 g (0.085 mole) of phenyl p-hydroxybenzoate, 10.55 g (0.057 mole) of 4,4'-dihydroxydiphenyl, 2.36 g (0.014 mole) of tert-butylhydroquinone, 16.69 g (0.078 mole) of diphenyl carbonate, and 0.005 g ($2.2 \times 10^{-5}$ mole) of n-butylstannoic acid, polymerization was carried out by the same method as in Example 6.

After completion of the reaction a pale brown polyester carbonate was obtained. The yield was found to be 24.31 g (97% by weight), and the inherent viscosity $[\eta_{inh}]$ was 1.51. Also, by measurement by DSC, the transition temperature from the crystal phase to the liquid phase was found to be 203° C, and the polyester carbonate exhibited an optical anisotropic phase under polarizing microscope observation at temperatures of 200° C. or higher. Further, the thermal decomposition initiation temperature (Td) by thermogravimetric analysis was 462° C.

The polyester carbonate was dried under a reduced pressure at 120° C. for 8 hours and then spun by a melt spinning device equipped with a spinneret having an opening diameter of 0.4 mm at a spinning temperature of 210° C. The polyester carbonate fiber obtained had a high strength and a high modulus, with a tensile strength of 28.5 kg/mm$^2$, a tensile modulus of 2440 kg/mm2, and an elongation of 1.7%.

EXAMPLE 8

By using 18.21 g (0.085 mole) of phenyl p-hydroxybenzoate, 10.55 g (0.057 mole) of 4,4'-dihydroxydiphenyl, 2.05 g (0.014 mole) of chlorohydroquinone, 16.69 g (0.078 mole) of diphenyl carbonate, and 0.005 g ($2.2 \times 10^{-5}$ mole) of n-butylstannoic acid, polymerization was carried out by the same method as in Example 6.

After completion of the reaction, a pale brown polyester carbonate was obtained. The yield was found to be 22.73 g (92% by weight), and the inherent viscosity $[\eta_{inh}]$ was 1.67. Also, by measurement by DSC, the transition temperature from the crystal phase to the liquid crystal phase was found to be 203° C, and the polyester carbonate exhibited an optical anisotropic phase under polarizing microscope observation at temperatures of 200° C. or higher. Further the thermal decomposition initiation temperature (Td) by thermogravimetric analysis was 472° C.

The polyester carbonate was dried under a reduced pressure at 120° C. for 8 hours, and then spun by a melt spinning device equipped with a spinneret having an opening diameter of 0.4 mm at a spinning temperature of 230° C. The polyester carbonate fiber obtained had a high strength and a high modulus, with a tensile strength of 27.3 kg/mm2, a tensile modulus of 2780 kg/mm$^2$, and an elongation of 1.9%.

EXAMPLE 9

By using 18.21 g (0.085 mole) of phenyl p-hydroxybenzoate, 10.55 g (0.057 mole) of 4,4'-dihydroxydiphenyl, 10.43 g (0.056 mole) of phenylhydroquinone, 26.63 g (0.124 mole) of diphenyl carbonate, and 0.005 g (2.2×10$^{-5}$ mole) of n-butylstannoic acid, polymerization was carried out by the same method as in Example 6.

After completion of the reaction, a pale brown polyester carbonate was obtained. The yield was found to be 33.52 g (98% by weight), and the inherent viscosity [$\eta_{inh}$] was 2.48. Also, the optical anisotropic phase was observed under a polarizing microscope at temperatures of 180° C. or higher. The thermal decomposition initiation temperature (Td) by thermogravimetric analysis was 471° C.

The polyester carbonate obtained was dried at 120° C. under a reduced pressure for 8 hours, and then injection molded by a Mini-Max injection molding machine, manufactured by CSI K.K., at an injection temperature of 190° C. and a mold cavity temperature of 80° C, to provide a tough molded product.

EXAMPLE 10

By using 18.21 g (0.085 mole) of phenyl p-hydroxybenzoate, 10.55 g (0.057 mole) of 4,4'-dihydroxydiphenyl, 1.30 g (0.007 mole) of phenylhydroquinone, 15.08 g (0.071 mole) of diphenyl carbonate, and 0.005 g (2.2×10$^{-5}$ mole) of n-butylstannoic acid, polymerization was carried out by the same method as in Example 6.

After completion of the reaction, a pale brown polyester carbonate was obtained. The yield was found to be 23.83 g (97% by weight), and the inherent viscosity [$\eta_{inh}$] was 2.62. By measurement by DSC, the transition temperature from the crystal phase to the liquid crystal phase was found to 218° C, and the polyester carbonate exhibited an optical anisotropic phase under polarizing microscope observation at temperatures of 215° C. or higher. Further, the thermal decomposition initiation temperature (Td) by thermogravimetric analysis was 475° C.

The polyester carbonate obtained was dried at 120° C. under a reduced pressure for 8 hours and then injection molded by a Mini-Max injection molding machine, manufactured by CSI K.K., at an injection temperature of 230° C. and a mold cavity temperature of 80° C, to provide a tough molded product.

EXAMPLE 11

By using 21.42 g (0.10 mole) of phenyl p-hydroxybenzoate, 27.93 g (0.15 mole) of 4,4'-dihydroxydiphenyl, 4.66 g (0.025 mole) of phenylhydroquinone, 41.24 g (0.193 mole) of diphenyl carbonate, and 0.005 g (2.2×10$^{-5}$ mole) of n-butylstannoic acid, polymerization was carried out by the same method as in Example 6.

After completion of the reaction, a pale brown polyester carbonate was obtained. The yield was found to be 47.18 g (96% by weight), and the inherent viscosity [$\eta_{inh}$] was 3.01. Also, by measurement by DSC, the transition temperature from the crystal phase to the liquid crystal phase was found to be 254° C, and the polyester carbonate exhibited an optical anisotropic phase under polarizing microscope observation at temperatures of 250° C. or higher. Further, the thermal decomposition initiation temperature (Td) by thermogravimetric analysis was 471° C.

The polyester carbonate obtained was dried at 120° C. under a reduced pressure for 8 hours and then injection molded by a Mini-Max injection molding machine, manufactured by CSI K.K., at an injection temperature of 255° C. and a mold cavity temperature of 80° C, to provide a tough molded product.

EXAMPLE 12

By using 21.42 g (0.10 mole) of phenyl p-hydroxybenzoate, 8.01 g (0.043 mole) of 4,4'-dihydroxydiphenyl, 2.64 g (0.014 mole) of phenylhydroquinone, 13.50 g (0.063 mole) of diphenyl carbonate and 0.005 g (2.2×10$^{-5}$ mole) of n-butylstannoic acid, polymerization was carried out by the same method as in Example 6.

After completion of the reaction, a pale brown polyester carbonate was obtained. The yield was found to be 22.90 g (95% by weight), and the inherent viscosity [$\eta_{inh}$] was 2.92. By measurement by DSC, the transition temperature from the crystal phase to the liquid crystal phase was found to be 231° C, and the polyester carbonate exhibited an optical anisotropic phase under polarizing microscope observation at temperatures of 230° C. or higher. Further, the thermal decomposition initiation temperature (Td) by thermogravimetric analysis was 468° C.

The polyester carbonate obtained was dried at 120° C. under a reduced pressure for 8 hours, and then injection molded by a Mini-Max injection molding machine, manufactured by CSI K.K., at an injection temperature of 235° C. and a mold cavity temperature of 80° C, to provide a tough molded product.

EXAMPLE 13

An amount of 18.21 g (0.085 mole) of phenyl p-hydroxybenzoate, 10.55 g (0.057 mole) of 4,4'-dihydroxydiphenyl, 3.09 g (0.014 mole) of 4,4'-dihydroxydiphenyl sulfide, 16.69 g (0.078 mole) of diphenyl carbonate, and 0.005 g (2.2×10$^{-5}$ of n-butylstannoic acid as the catalyst were charged into a polymerization reactor equipped with a stirrer and a vacuum evaporation device, and heated to 200° C. in nitrogen gas stream under a pressure of 650 mmHg. By elevating the temperature gradually to 300° C. over 10 hours and 10 minutes, phenol was further evaporated, the pressure was gradually reduced to 0.6 mm Hg, and the reaction was carried out over 55 minutes.

After completion of the reaction, a pale brown polyester carbonate was obtained. The yield was found to be 25.11 g (98% by weight), and the inherent viscosity [$\eta_{inh}$] was found to be 1.53. Also, by measurement by DSC, the transition temperature from the crystal phase to the liquid crystal phase was found to be 196° C, and the optical anisotropic phase was observed by a polarizing microscope at 190° C. or higher. The thermal decomposition initiation temperature (Td) by thermogravimetric analysis was found to be 484° C.

The polyester carbonate was dried under a reduced pressure at 120° C. for 8 hours, and then spun by a melt spinning device equipped with a spinneret having an opening diameter of 0.4 mm at a spinning temperature of 260° C. The polyester carbonate fiber obtained had a high strength and a high modulus, with a tensile strength of 24.3 kg/mm², a tensile modulus of 1380 kg/mm², and an elongation of 2.1%.

EXAMPLE 14

By using 18.21 g (0.085 mole) of phenyl p-hydroxybenzoate, 10.55 g (0.057 mole) of 4,4'-dihydroxydiphenyl, 3.04 g (0.014 mole) of 4,4'-dihydroxybenzophenone, 16.69 g (0.078 mole) of diphenyl carbonate, and 0.005 g ($2.2 \times 10^{-5}$ mole) of n-butylstannoic acid, polymerization was carried out by the same method as in Example 13.

After completion of the reaction, a pale brown polyester carbonate was obtained. The yield was found to be 25.24 g (98% by weight), and the inherent viscosity $[\eta_{inh}]$ was 1.86. Also, by measurement by DSC, the transition temperature from the crystal phase to the liquid phase was found to be 182° C, and the polyester carbonate exhibited an optical anisotropic phase under polarizing microscope observation at temperatures of 185° C. or higher. Further, the thermal decomposition initiation temperature (Td) by thermogravimetric analysis was 472° C.

The polyester carbonate obtained was dried at 120° C. under a reduced pressure for 8 hours, and then injection molded by a Mini-Max injection molding machine, manufactured by CSI K.K., at an injection temperature of 190° C. and a mold cavity temperature of 80° C, to provide a tough molded product.

EXAMPLE 15

By using 18.21 g (0.085 mole) of phenyl p-hydroxybenzoate, 10.55 g (0.057 mole) of 4,4'-dihydroxydiphenyl, 2.84 g (0.014 mole) of 4,4-dihydroxydiphenylmethane, 16.69 g (0.078 mole) of diphenyl carbonate, and 0.005 g ($2.2 \times 10^{-5}$ mole) of n-butylstannoic acid, polymerization was carried out by the same method as in Example 13.

After completion of the reaction, a milky white polyester carbonate was obtained. The yield was found to be 25.12 g (98% by weight), and the inherent viscosity $[\eta_{inh}]$ was 2.13. Also, by measurement by DSC, the transition temperature from the crystal phase to the liquid crystal phase was found to be 218° C, and the polyester carbonate exhibited an optical anisotropic phase under polarizing microscope observation at temperatures of 215° C. or higher. Further, the thermal decomposition initiation temperature (Td) by thermogravimetric analysis was 468° C.

The obtained polyester carbonate was dried at 120° C. under a reduced pressure for 8 hours and then injection molded by a Mini-Max injection molding machine, manufactured by CSI K.K., at an injection temperature of 220° C. and a mold cavity temperature of 80° C, to provide a tough molded product.

By using 18.21 g (0.085 mole) of phenyl p-hydroxybenzoate, 10.55 g (0.057 mole) of 4,4'-dihydroxydiphenyl, 2.83 g (0.014 mole) of 4,4'-dihydroxydiphenyl ether, 16,69 g (0.078 mole) of diphenyl carbonate, and 0.005 g ($2.2 \times 10^{-5}$ mole) of n-butylstannoic acid, polymerization was carried out by the same method as in Example 13.

After completion of the reaction, a pale brown polyester carbonate was obtained. The yield was found to be 24.92 g (98% by weight), and the inherent viscosity $[\eta^{inh}]$ was 2.06. By measurement by DSC, the transition temperature from the crystal phase to the liquid crystal phase was 194° C, and the optical anisotropic phase was observed under a polarizing microscope at temperatures of 190° C. or higher. The thermal decomposition initiation temperature (Td) by thermogravimetric analysis was 476° C.

The obtained polyester carbonate was dried at 120° C. under a reduced pressure for 8 hours and then injection molded by a Mini-Max injection molding machine, manufactured by CSI K.K., at an injection temperature of 200° C. and a mold cavity temperature of 80° C, to provide a tough molded product.

EXAMPLE 17

An amount of 18.21 g (0.085 mole) of phenyl p-hydroxybenzoate, 10.55 g (0.057 mole) of 4,4'-dihydroxydiphenyl, 1.56 g (0.014 mole) of resorcinol, 16.69 g (0.078 mole) of diphenyl carbonate, and 0.005 g ($2.2 \times 10^{-5}$ mole) of n-butylstannoic acid as the catalyst were charged into a polymerization reactor equipped with a stirrer and a vacuum evaporation device, and heated to 220° C. in a nitrogen gas stream under a pressure of 650 mmHg. After heating for 15 hours, by elevating the temperature gradually to 300° C, phenol was further evaporated over one hour and 35 minutes, the pressure was gradually reduced to 0.1 mmHg, and the reaction was carried out over one hour. After completion of the reaction, a pale green polyester carbonate was obtained. The yield was found to be 23.48 g (97% by weight). Also, by measurement by DSC, the transition temperature from the crystal phase to the liquid crystal phase was found to be 201° C, and the optical anisotropic phase was observed by a polarizing microscope at 190° C. or higher. The thermal decomposition initiation temperature (Td) by thermogravimetric analysis was found to be 468° C.

The polyester carbonate was dried under a reduced pressure at 120° C. for 8 hours, and then spun by a melt spinning device equipped with a spinneret having an opening diameter of 0.4 mm at a spinning temperature of 230° C. The polyester carbonate fiber obtained had a high strength and a high modulus, with a tensile strength of 20.6 kg/mm², a tensile modulus of 1490 kg/mm², and an elongation of 2.1%.

EXAMPLE 18

By using 18.21 g (0.085 mole) of phenyl p-hydroxybenzoate, 10.55 g (0.057 mole) of 4,4'-dihydroxydiphenyl, 2.27 g (0.014 mole) of 2,7-dihydroxynaphthalene, 16.69 g (0.078 mole) of diphenyl carbonate, and 0.005 g ($2.2 \times 10^{-5}$ mole) of n-butylstannoic acid, polymerization was carried out by the same method as in Example 17. After completion of the reaction, a dark green polyester carbonate was obtained. The yield was found to be 24.49 g (98% by weight). By measurement by DSC, the transition temperature from the crystal phase to the liquid crystal phase was found to be 182° C, and the optical anisotropic phase was observed under a polarizing microscope at temperatures of 180° C. or higher. The thermal decomposition initiation temperature (Td) by thermogravimetric analysis was found to be 462° C.

The polyester carbonate obtained was dried at 120° C. under a reduced pressure for 8 hours and then injection molded to provide a tough molded product.

EXAMPLE 19

By using 18.21 g (0.085 mole) of phenyl p-hydroxybenzoate, 10.55 g (0.057 mole) of 4,4'-dihydroxydiphenyl, 1.74 g (0.014 mole) of 2-methylresorcinol, 16.69 g (0.078 mole) of diphenyl carbonate, and 0.005 g ($2.2 \times 10^{-5}$ mole) of n-butylstannoic acid, polymerization was carried out by the same method as in Example 17. After completion of the reaction, a pale brown polyester carbonate was obtained. The yield was found to be 23.85 g (98% by weight). Also, the polyester carbonate exhibited an optical anisotropic phase under polarizing microscope observation at temperatures of 190° C. or higher. Further, the thermal decomposition initiation temperature (Td) by thermogravimetric analysis was found to be 460° C.

The polyester carbonate obtained was dried at 120° C. under a reduced pressure for 8 hours, and then injection molded to provide a tough molded product.

EXAMPLE 20

An amount of 18.21 g (0.085 mole) of phenyl p-hydroxybenzoate, 10.55 g (0.057 mole) of 4,4'-dihydroxydiphenyl, 2.27 g (0.014 mole) of 1,5-hydroxynaphthalene, 16.69 g (0.078 mole) of diphenyl carbonate, and 0.005 g ($2.2 \times 10^{-5}$ mole) of n-butylstannoic acid as the catalyst were charged into a polymerization reactor equipped with a stirrer and a vacuum evaporation device and heated to 200° C. in a nitrogen gas stream under a pressure of 650 mmHg. By elevating the temperature gradually to 300° C. over 10 hours and 20 minutes, phenol was further evaporated, the pressure was gradually reduced to 0.6 mmHg, and the reaction was carried out over one hour and 10 minutes.

After completion of the reaction, a pale brown polyester carbonate was obtained. The yield was found to be 23.75 g (96% by weight), and the inherent viscosity [$\eta_{inh}$] was found to be 1.42. Also, an optical anisotropic phase was observed by a polarizing microscope at 210° C. or higher. The thermal decomposition initiation temperature ($T_d$) by thermogravimetric analysis was found to be 462° C.

The polyester carbonate was dried under a reduced pressure at 120° C. for 8 hours, and then spun by a melt spinning device equipped with a spinneret having an opening diameter of 0.4 mm at a spinning temperature of 220° C. The polyester carbonate fiber obtained had a high strength and a high modulus, with a tensile strength of 24.5 kg/mm$^2$, a tensile modulus of 1860 kg/mm$^2$, and an elongation of 1.7%.

EXAMPLE 21

By using 18.21 g (0.085 mole) of phenyl p-hydroxybenzoate, 10.55 g (0.057 mole) of 4,4'-dihydroxydiphenyl, 2.27 g (0.014 mole) of 2,6-dihydroxynaphthalene, 16.69 g (0.078 mole) of diphenyl carbonate and 0.005 g ($2.2 \times 10^{-5}$ mole) of n-butylstannoic acid, polymerization was carried out by the same method as in Example 20.

After completion of the reaction, a pale brown polyester carbonate was obtained. The yield was found to be 24.81 g (99% by weight), and the inherent viscosity [$\eta_{inh}$] was 1.58. Also, by measurement by DSC, the transition temperature from the crystal phase to the liquid phase was found to be 232° C, and the polyester carbonate exhibited an optical anisotropic phase under polarizing microscope observation at temperatures of 235° C. or higher. Further, the thermal decomposition initiation temperature (Td) by thermogravimetric analysis was found to be 476° C.

The polyester carbonate was dried under a reduced pressure at 120° C. for 8 hours, and then spun by a melt spinning device equipped with a spinneret having an opening diameter of 0.4 mm at a spinning temperature of 250° C. The polyester carbonate fiber obtained had a high strength and a high modulus, with a tensile strength of 24.2 kg/mm$^2$, a tensile modulus of 1910 kg/mm$^2$, and an elongation of 1.9%.

EXAMPLE 22

By using 18.21 g (0.085 mole) of phenyl p-hydroxybenzoate, 10.55 g (0.057 mole) of 4,4'-dihydroxydiphenyl, 2.27 g (0.014 mole) of 1,4-dihydroxynaphthalene 16.69 g (0.078 mole) of diphenyl carbonate, and 0.005 g ($2.2 \times 10^{-5}$ mole) of n-butylstannoic acid, polymerization was carried out by the same method as in Example 20.

After completion of the reaction, a pale brown polyester carbonate was obtained. The yield was found to be 24.30 g (97% by weight), and the inherent viscosity [$\eta_{inh}$] was 2.48. The optical anisotropic phase was observed under polarizing microscope observation at temperatures of 230° C. or higher. Further, the thermal decomposition initiation temperature (Td) by thermogravimetric analysis was found to be 481° C.

The polyester carbonate obtained was dried at 120° C. under a reduced pressure for 8 hours, and then injection molded by a Mini-Max injection molding machine, manufactured by CSI K.K., at an injection temperature of 235° C. and a mold cavity temperature of 80° C, to provide a tough molded product.

EXAMPLE 23

By using 18.21 g (0.085 mole) of phenyl p-hydroxybenzoate, 10.55 g (0.057 mole) of 4,4'-dihydroxydiphenyl, 2.27 g (0.014 mole) of 2,3-dihydroxynaphthalene, 16.69 g (0.078 mole) of diphenyl carbonate, and 0.005 g ($2.2 \times 10^{-5}$ mole) of n-butylstannoic acid, polymerization was carried out by the same method as in Example 20.

After completion of the reaction, a pale brown polyester carbonate was obtained. The yield was found to be 24.06 g (96% by weight), and the inherent viscosity [$\eta_{inh}$] was 2.81. An optical anisotropic phase was observed under polarizing microscope observation at temperatures of 225° C. or higher. Further, the thermal decomposition initiation temperature (Td) by thermogravimetric analysis was found to be 481° C.

The polyester carbonate obtained was dried at 120° C. under a reduced pressure for 8 hours, and then injection molded by a Mini-Max injection molding machine, manufactured by CSI K.K., at an injection temperature of 230° C. and a mold cavity temperature of 80° C, to provide a tough molded product.

COMPARATIVE EXAMPLE 1

An aromatic polyester carbonate with the same composition as the aromatic polyester carbonate obtained from p-hydroxybenzoic acid, hydroquinone, 4,4'-dihydroxydiphenyl and diphenyl carbonate described in Example 6 in Japanese Unexamined Patent Publication (Kokai) No. 60-38427 was synthesized, and by measurement of the liquid crystal phase temperature range according to DSC, and polarizing microscope observation, a comparison was conducted with the molding temperature range of the aromatic polyester carbonate according to the present invention.

By using 22.49 g (0.105 mole) of phenyl p-hydroxybenzoate, 4.19 g (0.0225 mole) of 4,4'-dihydroxydiphenyl, 2.48 g (0.0225 mole) of hydroquinone, 10.60 g (0.0495 mole) of diphenyl carbonate, and 0.005 g ($2.2 \times 10^{-5}$ mole) of n-butylstannoic acid, polymerization was carried out by the same method as in Example 6.

After completion of the reaction, a pale brown polyester carbonate was obtained. The yield was found to be 19.68 g (96% by weight), and the inherent viscosity [$\eta_{inh}$] was 1.92. Also, by measurement according to DSC, the transition temperature from the crystal phase to the liquid crystal phase was found to be 262° C, and the polyester carbonate exhibited an optical anisotropic phase under polarizing microscope observation at temperatures of 260° C. or higher.

From the above experimental results, it can be seen that the transition temperature to the liquid crystal phase of the aromatic polyester carbonate according to Comparative Example 1 is considerably higher, compared with Examples of the present invention.

Especially when compared with Example 9, the transition temperature to the liquid crystal phase of Comparative Example 1 is higher by 80° C, and thus, compared with the aromatic polyester carbonate according to the present invention, the aromatic polyester carbonate of the Comparative Example has a higher and narrower moldable temperature range, and therefore an inferior molding processability.

The aromatic polyester carbonate obtained by the present invention has a low transition temperature from the crystal phase to the liquid crystal phase of 400° C. or lower. Especially, according to the present invention, an aromatic polyester carbonate which can enter the liquid crystal phase at a low temperature range of 180° C. to 260° C, which could not be obtained in the prior art, can be obtained.

Accordingly, the aromatic polyester carbonate of the present invention has an excellent moldability, and thus molding can be conducted over a broader temperature range.

Furthermore, since the aromatic polyester carbonate can be molded and processed at a lower temperature, which is impossible in the prior art, a useful polymer alloy can be produced by a composite with not only conventional engineering plastics but also conventional resins such as polyethylene and polypropylene.

Moreover, the mechanical properties thereof are superior due to the parallel molecular arrangement caused by the liquid crystal properties thereof, and accordingly, by carrying out a melt molding of the aromatic polyester carbonate obtained by the present invention, such as extrusion molding, injection molding, compression molding, or blow molding, useful molded products such as fibers, films molded articles, vessels, and hoses can be obtained.

We claim:

1. An aromatic polyester carbonate comprising structural units represented by the following formulae (A), (B), (C), and (D) and satisfying the following relationship when the mole fractions of the structural units represented by the formulae (A), (B), (C), and (D) are defined as a, b, c, and d, respectively:

$$0 \leq \frac{d}{a+b} \leq 0.50$$

and having an inherent viscosity [$\eta_{inh}$] in a solution at a concentration of 0.5 g/dl in p-chlorophenol as a solvent at 50° C. of 1.0 dl/g or higher, or being insoluble in the solvent, and having liquid crystal properties:

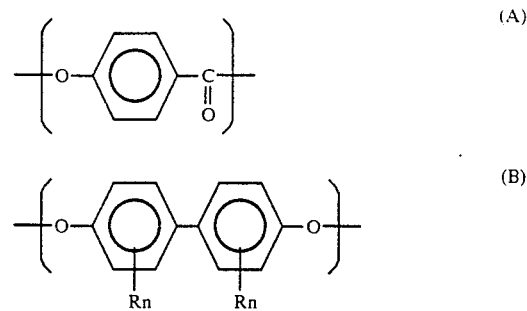

wherein R is the same or different and represent an alkyl, phenyl group or a halogen, and n represents an integer of 0 to 4;

and

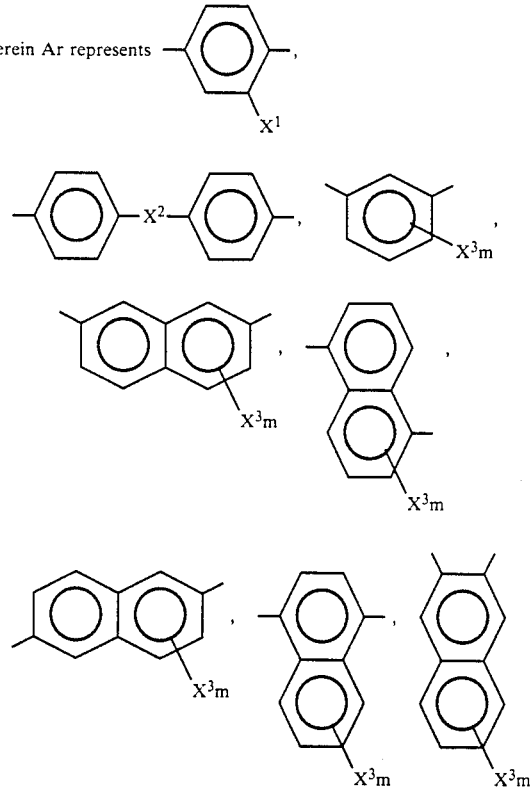

$X^1$ represents a substituted or non-substituted phenyl group, an alkyl group having 3 to 6 carbon atoms or a halogen;

$X^2$ represents —O—, —S—,

or —CH$_2$—;

$X^3$ is the same or different and represents an alkyl group, phenyl group, or a halogen; and m represents an integer of 0 to 4.

2. The aromatic polyester carbonate as claimed in claim 1, wherein said relationship is:

$$0 < \frac{d}{a+b} \leq 0.50$$

3. The aromatic polyester carbonate as claimed in claim 2, wherein Ar is

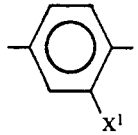

where $X^1$ is $-C_6H_5$, $-C(CH_3)_3$, or $-Cl$;

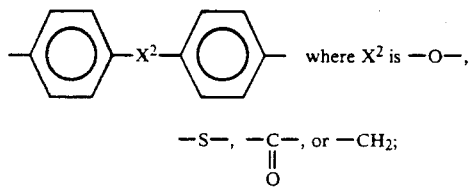 where $X^2$ is $-O-$, $-S-$, $-\underset{\underset{O}{\|}}{C}-$, or $-CH_2$;

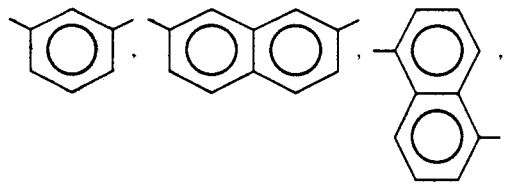

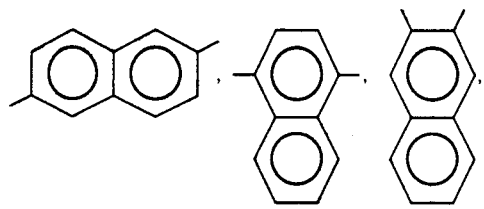

4. The aromatic polyester carbonate as claimed in claim 2, wherein Ar is

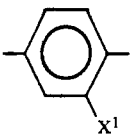

where $X^1$ is $-C_6H_5$, $-C(CH-3)_3$, or $-Cl$; or

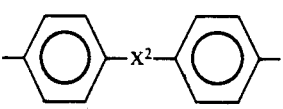

where $X^2$ is $-O-$, $-S-$, $-\underset{\underset{O}{\|}}{C}-$, or $-CH_2$.

5. The aromatic polyester carbonate as claimed in claim 2, wherein Ar is

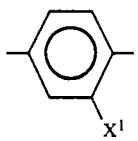

where $X^1$ is $-C_6H_5$, $-C(CH_3)_3$, or $-Cl$.

6. The aromatic polyester carbonate as claimed in claim 2, wherein said relationship is:

$$0.05 \leq \frac{d}{a+b} \leq 0.40$$

7. The aromatic polyester carbonate as claimed in claim 3, wherein said relationship is;

$$0.05 \leq \frac{d}{a+b} \leq 0.40$$

8. The aromatic polyester carbonate as claimed in claim 4, wherein said relationship is;

$$0.05 \leq \frac{d}{a+b} \leq 0.40$$

9. The aromatic polyester carbonate as claimed in claim 5, wherein said relationship is;

$$0.05 \leq \frac{d}{a+b} \leq 0.40$$

10. The aromatic polyester carbonate as claimed in claim 2, wherein the relationship $$\frac{a}{a+b}$$

is between 0.10 and 0.90.

11. The aromatic polyester carbonate as claimed in claim 2, wherein the relationship $$\frac{a}{a+b}$$

is between 0.40 and 0.70.

12. A process for producing the aromatic polyester carbonate according to claim 1, which comprises reacting hydroxybenzoic acid or a hydroxybenzoic acid ester represented by the formula (1) shown below, a diphenol represented by the formula (2), a diphenol represented by the formula (3), and diphenyl carbonate at a temperature of from 160° C. to lower than 2660° C. in the presence of a catalyst under a reduced pressure and then polymerizing same at a temperature of from 260 to 400° C. under a pressure of 10 mmHg or lower:

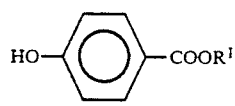 (1)

wherein $R^1$ represents hydrogen, an alkyl group, phenyl group or an alkyl-substituted phenyl group;

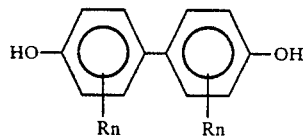 (2)

wherein R is either the same or different and represents an alkyl group, phenyl group or a halogen, and n represents an integer of 0 to 4;

HO—Ar—OH (3)

wherein Ar represents

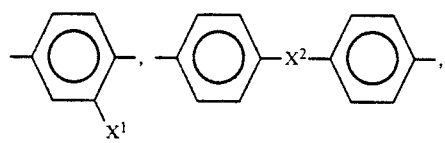

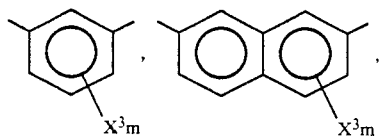

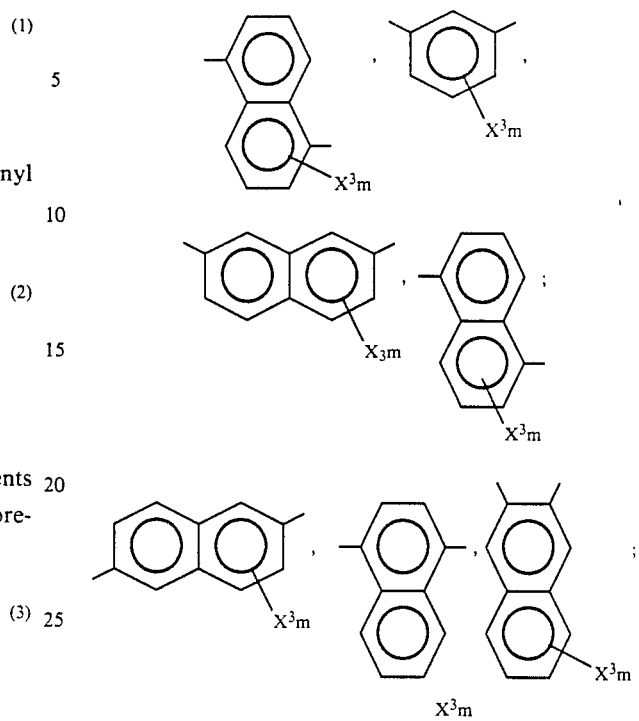

wherein $X^1$ represents a substituted or non-substituted phenyl group, an alkyl group having 3 to 6 carbon atoms, or a halogen;
$X^2$ represents —O—, —S—,

or —CH$_2$—;
$X^3$ is the same or different and represents an alkyl group, phenyl group, or a halogen; and
m represents an integer of 0 to 4.

* * * * *